(12) United States Patent
Reddy et al.

(10) Patent No.: US 7,153,899 B2
(45) Date of Patent: Dec. 26, 2006

(54) SILICONE-ACRYLATE IMPACT MODIFIERS AND METHOD FOR THEIR PREPARATION

(75) Inventors: Poreddy Narsi Reddy, Bangalore (IN); Alagarsamy Subbaiah, Bangalore (IN); Samik Gupta, Bangalore (IN); Prabh Rangorath Chatterji, Bangalore (IN)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 10/913,805

(22) Filed: Aug. 6, 2004

(65) Prior Publication Data

US 2005/0010001 A1   Jan. 13, 2005

Related U.S. Application Data

(63) Continuation-in-part of application No. 10/366,954, filed on Feb. 14, 2003, now abandoned.

(51) Int. Cl.
*C08K 5/5419* (2006.01)

(52) U.S. Cl. ............... 524/268; 524/269; 525/479; 525/902; 528/25

(58) Field of Classification Search ............. None
See application file for complete search history.

(56) References Cited

U.S. PATENT DOCUMENTS 4,888,388 A * 12/1989 Hongo et al. ............. 525/67
5,726,270 A    3/1998 Craig
6,169,149 B1   1/2001 Craig et al.

FOREIGN PATENT DOCUMENTS

| EP | 0 326 038 A | 8/1989 |
|---|---|---|
| EP | 0 368 203 A | 5/1990 |
| EP | 0430134 | 7/1996 |
| WO | WO 00/34346 A | 6/2000 |

OTHER PUBLICATIONS

English translation of CA 2,137,428.*

* cited by examiner

*Primary Examiner*—Marc S. Zimmer

(57) ABSTRACT

Disclosed herein is a silicone-acrylate impact modifier composition, where the impact modifier composition comprises structural units derived from: at least one silicone rubber monomer, a branched acrylate rubber monomer having the formula:

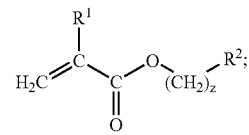

wherein $R^1$ is selected from hydrogen and $C_1$-$C_8$ linear and branched hydrocarbyl groups, $R^2$ comprises a branched $C_3$-$C_{16}$ hydrocarbyl group; and "z" is greater than or equal to 3; a first graft link monomer; a polymerizable alkenyl-comprising organic material; and a second graft link monomer The silicone-acrylate impact modifier compositions disclosed herein are useful for making molding compositions, which are useful for producing various articles, especially for outdoor applications.

26 Claims, No Drawings

US 7,153,899 B2

SILICONE-ACRYLATE IMPACT MODIFIERS AND METHOD FOR THEIR PREPARATION

CROSS-REFERENCE TO RELATED APPLICATIONS

This application is a continuation-in-part of application Ser. No. 10/366,954, filed Feb. 14, 2003 and now abandoned, which is incorporated herein by reference.

BACKGROUND OF THE INVENTION

The disclosure relates generally to silicone-acrylate impact modifiers and their use in resin molding compositions, particularly those comprising thermoplastic resins. Furthermore, the disclosure also relates to an emulsion polymerization method for making the silicone-acrylate impact modifiers.

Butadiene-based impact modifiers, such as acrylonitrile-butadiene-styrene (also called ABS) copolymers and methyl methacrylate-butadiene-styrene (also called MBS) copolymers have been previously used to improve the impact performance of thermoplastic materials. However, due to the presence of unsaturation, these butadiene-based copolymers respond poorly to weathering. Weathering is a phenomenon where the combined effect of several natural elements, particularly oxygen in air and sunlight act upon the polymer thereby causing the material to degrade. Generally, this degradation is observable by a yellowing and loss of surface gloss of the polymer material. Impact modifiers based on acrylonitrile-styrene-acrylate (also called ASA) copolymers avoid the issues faced by the butadiene-based polymers. However, these materials only have room temperature ductility. Acrylate rubbers are widely used for impact modification of thermoplastic materials where weathering is a concern. However, the impact strength of acrylate rubber-modified thermoplastic materials at low temperatures, such as 0° C. or below, is substantially reduced as compared to thermoplastic materials containing other organic blends, such as the butadiene-based polymers. Efforts have been made to use silicone-based materials to improve low temperature impact. For example, silicone-polycarbonate copolymers show good ductility at minus 40° C., but they can be used only in polycarbonates and polycarbonate blends. Efforts to improve the low temperature impact of thermoplastic polymer compositions by using silicone rubber-based impact modifiers, such as Mitsubishi Rayon's S 2001 are known. However, the low temperature impact and ductility performance, as measured for example by the ductile-to-brittle transition temperature (hereinafter referred to as "DBTT"), is in some cases not up to the desired mark. Therefore, there is a continued need for impact modifiers that can afford superior impact properties, lower ductile-to-brittle transition temperatures (hereinafter sometimes referred to as DBTT's), and outstanding weatherability performance, that is, a slowing down or prevention of yellowing and loss of surface gloss, in polymer compositions and articles comprising these polymer compositions. Such impact modifiers, when incorporated into polymer resin systems are expected to find a wide variety of applications, especially outdoor applications.

BRIEF DESCRIPTION OF THE INVENTION

Briefly, one embodiment of the disclosure is a silicone-acrylate impact modifier composition, wherein the impact modifier composition comprises structural units derived from: at least one silicone rubber monomer, a branched acrylate rubber monomer having the formula:

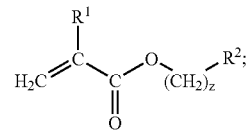

wherein $R^1$ is selected from hydrogen and $C_1$–$C_8$ linear and branched hydrocarbyl groups, $R^2$ comprises a branched $C_3$–$C_{16}$ hydrocarbyl group; and "z" is greater than or equal to 3; a first graft link monomer, a polymerizable alkenyl-comprising organic material, and a second graft link monomer.

Another embodiment of the disclosure is a silicone-acrylate impact modifier composition, wherein the impact modifier composition comprises structural units derived from: a silicone rubber monomer mixture comprising octamethylcyclotetrasiloxane and tetraethoxysilane; a branched acrylate rubber monomer selected from the group consisting of iso-octyl acrylate, 6-methyloctyl acrylate, 7-methyloctyl acrylate, 6-methylheptyl acrylate, and combinations of the foregoing branched acrylate rubber monomers; at least one first graft link monomer selected from the group consisting of (gamma-methacryloxypropyl)(dimethoxy)methylsilane and (3-mercaptopropyl)trimethoxysilane; a polymerizable alkenyl-comprising organic material comprising at least one of styrene, alpha-methylstyrene, divinyl benzene, acrylonitrile, methacrylonitrile, or methyl methacrylate; and at least one second graft link monomer selected from the group consisting of allyl methacrylate, triallyl cyanurate, diallyl maleate, and triallyl isocyanurate.

Still another embodiment of the disclosure is a molding composition comprising a polymer resin and a silicone-acrylate impact modifier composition, wherein said impact modifier composition comprises structural units derived from: at least one silicone rubber monomer, a branched acrylate rubber monomer having the formula:

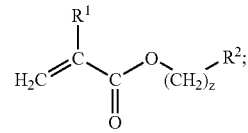

wherein $R^1$ is selected from hydrogen and $C_1$–$C_8$ linear and branched hydrocarbyl groups, $R^2$ comprises a branched $C_3$–$C_{16}$ hydrocarbyl group; and "z" is greater than or equal to 3; a first graft link monomer, a polymerizable alkenyl-comprising organic material, and a second graft link monomer; wherein said molding composition has a ductile-to-brittle transition temperature of from about 0° C. to about minus 60° C.

Yet another embodiment of the disclosure is a molding composition comprising a polymer resin and a silicone-acrylate impact modifier composition, wherein the silicone-acrylate impact modifier composition comprises structural units derived from: a silicone rubber monomer mixture comprising octamethylcyclotetrasiloxane and tetraethoxysilane; at least one branched acrylate rubber monomer selected from the group consisting of iso-octyl acrylate, 6-methyloctyl acrylate, 7-methyloctyl acrylate, 6-methylheptyl acrylate, and combinations of the foregoing branched acrylate rubber monomers; at least one first graft link monomer selected from the group consisting of (gamma-methacryloxypropyl)(dimethoxy)methylsilane and (3-mercaptopropyl) trimethoxysilane; at least one polymerizable alkenyl-comprising organic material comprising at least one of styrene, alpha-methylstyrene, divinyl benzene, acrylonitrile, methacrylonitrile, or methyl methacrylate; and at least one second graft link monomer selected from the group consisting of allyl methacrylate, triallyl isocyanurate, diallyl maleate, and triallyl cyanurate; wherein said molding composition has a ductile-to-brittle transition temperature of from about 0° C. to about minus 60° C.

Yet another embodiment of the disclosure is a method for making a silicone-acrylate impact modifier composition, where the method comprises: emulsion polymerizing at least one silicone rubber monomer and a first graft link monomer at a temperature of from about 30° C. to about 110° C. to form a silicone rubber latex; adding to said silicone rubber latex, at a pH of about 4 to about 9.5, and a temperature of from about 20° C. to about 90° C., at least one branched acrylate rubber monomer and a second graft link monomer to provide a silicone-acrylate rubber hybrid latex; grafting the silicone-acrylate rubber hybrid latex with at least one polymerizable alkenyl-comprising organic material to form a silicone-acrylate graft copolymer latex; and coagulating, washing, and drying the silicone-acrylate graft copolymer latex to provide the silicone-acrylate impact modifier composition; wherein the at least one branched acrylate rubber monomer has the formula:

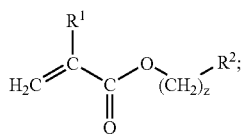

wherein $R^1$ is selected from hydrogen and $C_1$–$C_8$ linear and branched hydrocarbyl groups, $R^2$ comprises a branched $C_3$–$C_{16}$ hydrocarbyl group; and "z" is greater than or equal to 3.

DETAILED DESCRIPTION OF THE INVENTION

In the following specification and the claims that follow, reference will be made to a number of terms that shall be defined to have the following meanings. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. The terminology "polyethylenically unsaturated" means having two or more sites of ethylenic unsaturation per molecule. The terminology "(meth)acrylate" refers collectively to acrylate and methacrylate; for example, the term "(meth)acrylate monomers" refers collectively to acrylate monomers and methacrylate monomers. The term "(meth)acrylamide" refers collectively to acrylamides and methacrylamides. The expressions "silicone-acrylate impact modifier" and "silicone-acrylate graft copolymer latex" mean an interpenetrating composite of silicone rubber and polyacrylate rubber, where the silicone rubber and polyacrylate rubber are entangled in an inseparable fashion at the molecular level. The term "hydrocarbyl radical" denotes a monovalent radical which may be a linear, branched, cyclic, or polycyclic aliphatic radical or aromatic radical. Unless otherwise specified, hydrocarbyl radicals comprise $C_1$ to $C_{12}$ aliphatic radicals or $C_6$ to $C_{10}$ aromatic radicals containing carbon and hydrogen atoms, optionally substituted with heteroatoms selected from Groups 15, and 16 of the Periodic Table, such as oxygen or sulfur; and optionally substituted with at least one linear, branched, cyclic, or polycyclic $C_1$ to $C_{12}$ aliphatic radical or at least one $C_6$ to $C_{10}$ aromatic radical.

The impact modifier compositions disclosed herein display many of the properties that make them valuable materials for use in outdoor applications, especially in cold climates. The impact modifier compositions display ductile-to-brittle transition temperatures of from about 0° C. to about minus 60° C., outstanding low temperature ductility and impact, and excellent weatherability performance, while retaining other desirable properties, such as heat distortion temperature (hereinafter sometimes referred to as "HDT"), tensile and flexural modulus, and melt volume ratio (hereinafter sometimes referred to as "MVR").

Suitable branched acrylate monomers useful for the silicone-acrylate impact modifier compositions of the disclosure are represented by formula (I):

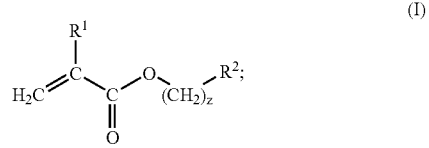

wherein $R^1$ is selected from hydrogen and $C_1$–$C_8$ linear and branched hydrocarbyl groups, $R^2$ comprises a branched $C_3$–$C_{16}$ hydrocarbyl group; and "z" is greater than or equal to 3. In an embodiment, the branched acrylate monomer is one wherein $R^1$ is hydrogen and $R^2$ is at least one branched aliphatic hydrocarbyl radical selected from 4-methylpentyl, 4-methylhexyl, 6-methylheptyl, and 5-methylhexyl. In general, the branched acrylate monomers of formula (I) have structures in which the $R^2$ group is separated from the acrylate acyl oxygen (that is, the oxygen atom located next to the acrylate carbonyl group) by at least 3 $CH_2$ groups. In a particular embodiment, the branched acrylate monomer is 6-methylheptyl acrylate. The branched acrylate monomers can be prepared by methods known in the art. For example, reaction of acryloyl chloride with the appropriate branched alcohol in the presence of a tertiary amine scavenger to trap the hydrogen chloride by-product furnishes the desired branched acrylate ester. Some of the branched acrylate monomers, such as 6-methylheptyl acrylate are commercially available from vendors, such as Aldrich Chemical Company. In another embodiment, the silicone-acrylate impact modifier composition further comprises structural units derived from at least one linear alkyl acrylate monomer selected from the group consisting of methyl acrylate, ethyl acrylate, n-propyl acrylate, and n-butyl acrylate.

The silicone-acrylate impact modifier comprises structural units derived from silicone rubber monomers. A variety of silicone rubber monomers can be used. In general, the silicone rubber monomer comprises at least one cyclic siloxane, and at least one member selected from the group consisting of tetraalkoxysilanes and trialkoxysilanes. Suitable cyclic siloxanes comprise those of the formula (II):

(II)

wherein $R^3$ and $R^4$ are independently selected from hydrogen and $C_1$–$C_{10}$ alkyl and aryl radicals; and "n" has a value of from about 3 to about 20. In some embodiments, $R^3$ or $R^4$, or both can be aryl groups. Suitable non-limiting examples of aryl radicals include phenyl, tolyl, xylyl, and the like. Phenyl radical is a preferred aryl radical since the phenyl-substituted silicone rubber monomers are relatively more readily available. Some of the preferred silicone rubber monomers include cyclic siloxanes such as octamethylcyclotetrasiloxane, as shown for example in the Encyclopedia of Polymer Science and Engineering, volume 15, 2nd Edition, pp. 205–308 (1989), John Wiley and Sons. Other examples of cyclic siloxanes include without limitation, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, hexamethylcyclotrisiloxane, and octaphenylcyclotetrasiloxane. Any mixture of these or similar cyclic siloxanes can also be used.

The tetraalkoxysilane and trialkoxysilane type silicone rubber monomers are represented by the general formula (III):

$$(R^5)_s Si(OR^6)_{4-s} \quad (III)$$

where each $R^5$ independently comprises a $C_1$–$C_{10}$ aliphatic or aromatic hydrocarbyl radical; each $R^6$ independently comprises a $C_1$–$C_4$ aliphatic hydrocarbyl radical; and "s" has a value of either 0 or 1. Suitable non-limiting examples of aryl radicals include phenyl, tolyl, xylyl, and the like. Phenyl radical is a preferred aryl radical since the phenyl-substituted silicone rubber monomers are relatively more readily available. Examples of suitable trialkoxysilanes include, but are not intended to be limited to methyltrimethoxysilane, methyltriethoxysilane, phenyltrimethoxysilane, phenyltriethoxysilane, and the like. Examples of suitable tetraalkoxysilanes include, but are not intended to be limited to tetramethoxysilane, tetraethoxysilane, tetraisopropoxysilane, and tetrabutyloxysilane, and the like. In a particular embodiment, tetraethoxysilane or tetraethylorthosilicate (hereinafter sometimes also referred to as "TEOS") can be conveniently used as a silicone rubber monomer. The tetraalkoxysilanes and trialkoxysilanes can be used at from about 0.1% to about 30% by weight of the silicone rubber monomer mixture used for preparing the silicone-acrylate impact modifier. In another embodiment, any mixture comprising at least one tetraalkoxysilane or at least one trialkoxysilane monomer of formula (III) can also be used.

The first graft link monomer used for preparing the silicone-acrylate impact modifier comprises at least one of an (acryloxyalkyl) alkoxysilane, a (mercaptoalkyl)(alkoxy) silane, a vinylalkoxysilane, or an allylalkoxysilane. Suitable (acryloxyalkyl) alkoxysilanes that can be used as the first graft link monomer comprise those of the formula (IV):

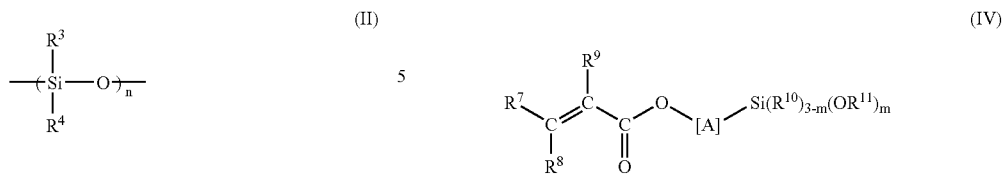

(IV)

wherein each of $R^7$, $R^8$, and $R^9$ is independently selected from hydrogen and $C_1$–$C_6$ hydrocarbyl radicals with the proviso that at least one of $R^7$ and $R^8$ is hydrogen; [A] comprises a $C_1$–$C_{12}$ alkylene radical; each $R^{10}$ is independently selected from $C_1$–$C_{10}$ hydrocarbyl radicals; each $R^{11}$ is independently selected from $C_1$–$C_6$ hydrocarbyl radicals; and "m" is an integer having a value of 1 to 3. Any mixture of (acryloxyalkyl) alkoxysilanes can also be used. In an embodiment, $R^7$ and $R^8$ are hydrogen, $R^9$ is methyl, and [A] is a —CH$_2$CH$_2$CH$_2$— radical. In another embodiment, (gamma-methacryloxypropyl)silanes, in which $R^{10}$ is a methyl or a phenyl group; and $R^{11}$ is a methyl, ethyl, or an isopropyl group can be used as first graft link monomers. (Gamma-methacryloxypropyl) dimethoxymethylsilane and (gamma-methacryloxypropyl)trimethoxysilane are particularly convenient and versatile first graft link monomers due to their ready availability.

Mercaptan-functionalized (hydrocarbyl)trialkoxysilanes are particularly valuable examples of (mercaptoalkyl)(alkoxy)silanes for use as first graft link monomers. Examples of suitable mercaptan-functionalized (hydrocarbyl)trialkoxysilanes include (3-mercaptopropyl)trimethoxysilane (hereinafter sometimes referred to as "MPTMS"), (4-mercaptobutyl)trimethoxysilane, (2-mercaptoethyl)trimethoxysilane, (3-mercaptopropyl)triethoxysilane, and the like.

Another type of a useful first graft link monomer is a substituted or an unsubstituted allylalkoxysilane of the formula (V):

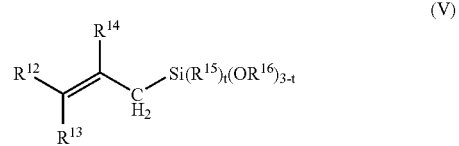

(V)

wherein each of $R^{12}$, $R^{13}$, and $R^{14}$ is independently selected from hydrogen and $C_1$–$C_4$ hydrocarbyl radicals with the proviso that at least one of $R^{12}$ and $R^{13}$ is hydrogen; each $R^{15}$ independently comprises $C_1$–$C_8$ hydrocarbyl radicals, each $R^{16}$ independently comprises $C_1$–$C_4$ hydrocarbyl radicals, and "t" has a value of either 0 or 1. Mixtures of the allylalkoxysilanes can also be used. Examples of suitable allylalkoxysilanes include, but are not intended to be limited to allyltrimethoxysilane, allyltriethoxysilane, crotyltrimethoxysilane, crotyltriethoxysilane, (3-phenyl-2-propenyl) trimethoxysilane, and the like. In a particular embodiment, allyltrimethoxysilane is a suitable first graft link monomer. In other embodiments, the first graft link monomer can also comprise compounds that have 2 alkoxy groups and 2 allylic groups about the silicon atom. Furthermore, the 2 alkoxy groups can be the same or different. Likewise, the 2 allylic groups can be the same or different.

Vinylalkoxysilanes can also be used as suitable first graft link monomers. Suitable vinylalkoxysilanes include, but are not limited to, those of the formula (VI):

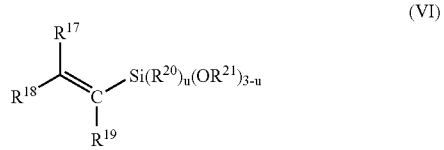

wherein each of $R^{17}$, $R^{18}$, and $R^{19}$ is independently selected from hydrogen and $C_1$–$C_4$ hydrocarbyl radicals with the proviso that at least one of $R^{17}$ and $R^{18}$ is hydrogen; each $R^{20}$ independently comprises $C_1$–$C_8$ hydrocarbyl radicals; each $R^{21}$ independently comprises $C_1$–$C_4$ hydrocarbyl radicals, and "u" has a value of either 0 or 1. Mixtures of the vinylalkoxysilanes can also be used. Suitable vinylalkoxysilanes include vinyltrimethoxysilane, vinyltriethoxysilane, (1-propenyl)trimethoxysilane, styryltrimethoxysilane, divinyldimethoxysilane, divinyldiethoxysilane, and the like.

In an embodiment, the first graft link monomer is at least one selected from the group consisting of (gamma-methacryloxypropyl)(dimethoxy)methylsilane, (3-mercaptopropyl)trimethoxysilane, vinyltrimethoxysilane, and allyltrimethoxysilane. It will be apparent to those skilled in the art that different combinations of the above-mentioned different types of first graft link monomer can be used to form the silicone-acrylate impact modifier composition. The first graft link monomer can be used at from about 0.1% to about 30% by weight of the combined weight of the silicone rubber monomer and the first graft link monomer.

The second graft link monomer is at least one polyethylenically unsaturated compound having at least one allyl group. In one embodiment, the polyethylenically unsaturated compound is at least one selected from the group consisting of allyl methacrylate, triallyl cyanurate (hereinafter sometimes referred to as "TAC"), triallyl isocyanurate, and diallylmaleate.

The polymerizable alkenyl-comprising organic material comprises at least one monomer selected from the group consisting of aromatic vinyl monomers, olefins, olefinic nitriles, branched and unbranched (meth)acrylate monomers, and other polymerizable vinyl compounds. Suitable alkenyl-comprising organic materials used for preparing the silicone-acrylate impact modifier compositions include without limitation: styrene, divinylbenzene, alpha-methylstyrene, vinyl toluene, halogenated styrene, and the like; (meth)acrylates, such as methyl methacrylate, 2-ethylhexyl methacrylate; methyl acrylate, ethyl acrylate, n-propyl acrylate, n-butyl acrylate; n-pentyl acrylate, n-hexyl acrylate, n-heptyl acrylate, and n-octyl acrylate; olefinic nitriles, such as acrylonitrile and methacrylonitrile; olefins such as ethylene, propylene, butadiene, isoprene, chloroprene and 5-vinyl-2-norbornene; and other vinyl compounds such as (meth)acrylamides, N-(mono- or di-substituted alkyl)acrylamides, vinylimidazole, vinyl acetate, vinyl alkyl ethers, vinyl chloride, vinyl furan, N-vinyl carbazole, vinyl pyridine, vinyl pyrrolidines, allyl methacrylate, triallyl cyanurate, triallyl isocyanurate, ethylene dimethacrylate, diallyl maleate, maleic anhydride; maleimide compounds such as maleimide or N-phenyl (or N-alkyl) maleimide; and mixtures of these monomers. In an embodiment, the polymerizable alkenyl-comprising organic material is at least one selected from the group consisting of styrene, alpha-methylstyrene, acrylonitrile, methacrylonitrile, butyl acrylate, and methyl methacrylate.

The silicone-acrylate impact modifier compositions disclosed herein may be prepared by emulsion polymerization techniques. In the first step of the technique, at least one silicone rubber monomer is reacted with at least one first graft link monomer at a temperature of from about 30° C. to about 110° C., and preferably from about 75° C. to about 95° C., to form a silicone rubber latex. An effective amount of a surfactant can be used initially in the reactor as part of an agitated aqueous mixture, or it can be introduced with the silicone rubber monomers. Surfactants that can be used comprise acid catalyst-surfactants optionally in combination with surface-active sulfonic acid salts. The reaction may be conducted at a pH of 1–5 in one embodiment and at a pH of 1–3 in another embodiment. Non-limiting examples of sulfonic acids include alkylsulfonic acids, alkarylsulfonic acids, arylsulfonic acids, or mixtures thereof. Non-limiting examples of surface-active sulfonic acid salts include metal salts, for example, alkali metal salts; or nonmetal salts, example, ammonium or phosphonium salts. Dodecylbenzenesulfonic acid is a preferred surfactant. In one embodiment of the method, the addition of monomers can be carried out batch wise or semi-continuously, and in a drop wise manner, over a period of up to 24 hours. The types of silicone rubber monomers and the first graft link monomers that can be used have been described previously. In another embodiment of the method, octamethylcyclotetrasiloxane (hereinafter sometimes referred to as "$D_4$") and tetraethoxysilane are reacted with (gamma-methacryloxypropyl)(dimethoxy)methylsilane (hereinafter sometimes referred to as "MAPDMMS") as a first graft link monomer to form the silicone rubber latex. MAPDMMS facilitates chemical linking of acrylate chains onto the siloxane network. TEOS serves to form a weak cross-link in the silicone rubber latex particles, whose size, in an embodiment, can be expressed in terms of the volume average particle size. The volume average size of the silicone rubber latex particle depends on the cross-linking density. A higher cross-linking density generally results in a lowered volume average particle size of the silicone rubber latex. In one embodiment, the method affords silicone rubber latex having a volume average particle size of from about 50 nanometers to about 2 microns in one embodiment and from about 100 nanometers to about 2 microns in another embodiment.

The silicone rubber latex can also be synthesized through an emulsion polymerization route by using an additional homogenization step. The homogenization step generates particles having an average size of less than 500 nanometers with a substantially broad particle size distribution (hereinafter sometimes referred to as "PSD"). This creates performance issues in certain types of polymer resin blends, since specific types of polymer resin systems require a certain type of average particle size and PSD for the silicone-acrylate impact modifier compositions. For example, it is preferable to use silicone-acrylate impact modifier compositions having a relatively smaller average particle size and narrower (that is, closer to a mono-modal) PSD for polycarbonate resin blends, but a relatively broader (that is, closer to a bimodal) PSD for styrene-acrylonitrile copolymer resin blends. The method for forming the silicone-acrylate impact modifier compositions disclosed herein includes in an embodiment, a semi-continuous emulsion polymerization process without the homogenization step, where the particle size can be controlled such that one can achieve an average particle size of either less than or equal to about 500 nanometers, or greater than or equal to about 500 nanometers.

In the second step of the technique, at least one branched acrylate rubber monomer of the formula (I) and a second graft link monomer are polymerized at a pH of about 4 to about 9.5 and a temperature of from about 20° C. to about 90° C., with the silicone rubber latex obtained in the first step to provide a latex comprising an emulsion polymerized silicone-acrylate rubber hybrid. In one embodiment, a branched acrylate rubber monomer of formula (I), such as isooctyl acrylate is polymerized with the silicone rubber latex particles in presence of a second graft linking monomer, such as allyl methacrylate, triallyl isocyanurate, or triallyl cyanurate to obtain silicone-acrylate rubber hybrid latex particles. In an embodiment, allyl methacrylate can perform the dual function of cross linking the acrylate chains as well as acting as a graft linker (via the allyl group) for the grafting reaction with the polymerizable alkenyl-comprising organic material in the third stage as described later in the disclosure. In another embodiment, a mixture of acrylate rubber monomers comprising at least one branched acrylate rubber monomer of formula (I) and at least one linear acrylate rubber monomer, such as butyl acrylate can also be employed. The addition of the acrylate monomers to the silicone rubber latex occurs before, or concurrently with addition of a polymerization catalyst. The polymerization catalyst can be any material known in the art to initiate free radical polymerization, such as an alkali metal persulfate; or an organic soluble radical initiator, such as azobisisobutyronitrile, or an organic peroxide, such as benzoyl peroxide, dichlorobenzoyl peroxide, cumene hydroperoxide, or tert-butyl perbenzoate, to polymerize the acrylate rubber monomer and effect silicone-acrylate rubber hybrid latex formation. When an alkali metal persulfate catalyst is used, it is preferred that the persulfate be added over time to keep the vinyl polymerization running. This technique also minimizes degradation of the persulfate under the acid conditions present during the polymerization of the silicone rubber monomers. The silicone-acrylate rubber hybrid latex, thus produced from the emulsion polymerization, comprises about 95 parts to about 5 parts by weight of silicone rubber, and about 5 parts to about 95 parts by weight of polyacrylate rubber, per 100 parts by weight of the silicone-acrylate rubber hybrid latex.

In the third step, the latex comprising the emulsion polymerized silicone-acrylate rubber hybrid produced in the second step is reacted with at least one polymerizable alkenyl-comprising organic material to form a silicone-acrylate graft copolymer latex. The polymerizable alkenyl-comprising organic material can comprise one or more alkenyl groups. In an embodiment, the polymerizable alkenyl-comprising organic material is at least one selected from the group consisting of styrene, alpha-methylstyrene, isomeric divinyl benzenes, acrylonitrile, methacrylonitrile, and methyl methacrylate. The proportion of alkenyl-comprising organic material and the silicone-acrylate rubber hybrid latex can vary widely, such as for example, from about 0.15 part to about 3.0 part by weight of alkenyl-comprising organic material, per part of the silicone-acrylate rubber hybrid latex. When a mixture of styrene and acrylonitrile is used, then their weight ratio, in one embodiment, is between about 90:10 to about 50:50.

The latex particles of the silicone-acrylate graft copolymer are separated from an aqueous phase through coagulation (by treatment with a coagulant) and dried to a fine powder to produce the silicone-acrylate impact modifier composition. The method described hereinabove can be generally used for producing the silicone-acrylate impact modifier having a particle size of from about 70 nanometers to about 2 microns. In an embodiment, the method described hereinabove can be carried out batch wise or semi-continuously. In the batch wise process, one or more silicone rubber monomers are charged into a polymerization reactor containing water, and the polymerization reaction is then carried out. In the semi-continuous process, a portion of one or more silicone rubber monomers is taken in water in the polymerization reactor, and subsequently the remaining portion of the silicone rubber monomer is added over a period of time to form the silicone rubber latex particles. The semi-continuous process also includes the employment of mild, and/or low shear non-homogenizing conditions during the emulsion polymerization of the silicone rubber monomers.

The silicone-acrylate impact modifier compositions disclosed hereinabove are useful materials for preparing polymer molding compositions comprising at least one polymer resin and said impact modifier composition. The molding compositions have improved properties, such as stiffness, low temperature ductility, weatherability, and chemical resistance. The impact modifier compositions also confer unexpectedly, a higher melt volume rate to the molding compositions during the processing step. A higher melt volume rate generally translates to easier processing of the molding compositions, which can be a significant benefit commercially.

The silicone-acrylate impact modifier can comprise from about 1 part to about 50 parts by weight, in one embodiment, and from about 5 parts to about 25 parts by weight, in another embodiment, per 100 parts by weight of the molding composition. More particularly, the silicone-acrylate impact modifier comprises from 7 parts to about 15 parts by weight, per 100 parts by weight of the molding composition.

The polymer molding composition generally comprises a polymer resin that can be a thermoset polymer, a thermoplastic polymer, or combinations of both types of polymers. In an embodiment, the thermoplastic polymer is selected from the group consisting of polycarbonates, polyesters, polyolefins, polyestercarbonates, polyamides, polyethersulfones, polyetherimides, polyphenylene ethers, acrylate polymers, styrenic polymers, vinyl halide polymers, and blends of the foregoing polymers. The thermoplastic polymers can be prepared by any of the methods known in the art. For example, suitable polycarbonates that can be used comprise those that are made by known techniques such as interfacial polymerization, melt polycondensation, bischloroformate polymerization with dihydric phenols and diols; and polymerization of dihydric phenols and diols with bissalicylate carbonates, such as bis(methylsalicylate)carbonate. More particularly, the thermoplastic polymer is selected from the group consisting of bisphenol A polycarbonate, 1,3-bis(4-hydroxyphenyl)-1-methyl-4-isopropylcyclohexane polycarbonate, polybutylene terephthalate (PBT), polyethylene terephthalate (PET), acrylonitrile-styrene-acrylate core shell polymers, acrylonitrile-styrene-alpha-methylstyrene-acrylate core shell polymers, styrene-acrylonitrile copolymer, styrene-methacrylonitrile copolymer, acrylonitrile-butadiene-styrene copolymer, acrylonitrile-alpha-methylstyrene-butadiene copolymer, copolymers comprising structural units derived from isophthalic acid, terephthalic acid, resorcinol, and bisphenol A (hereinafter sometimes referred to as "ITR"); and blends of the foregoing polymers. The ITR copolymers are a class of polymers that have carbonate and ester functionalities on the polymer backbone. They can be prepared by polymerization techniques known in the art. More particularly, the ITR copolymers may be prepared by a stepwise interfacial polymerization process. A mixture of isophthaloyl chloride and terephthaloyl chloride is added to an excess of resorcinol in a two-phase system comprising aqueous alkali metal hydroxide and a halogenated hydrocarbon solvent, such as dichloromethane. The reaction is carried out in the presence of an acid scavenger, such as triethylamine to trap the hydrogen chloride generated during the reaction, while maintaining the pH of the system at about 7. The product of this reaction is an oligomeric polycarbonate having hydroxy groups at both ends of the oligomer chain. In the next step, the oligomeric hydroxy-terminated polycarbonate is combined with an aromatic bisphenol, such as bisphenol A, and reacted with phosgene in a two phase system comprising aqueous alkali metal hydroxide and a halogenated hydrocarbon solvent, such as dichloromethane. A suitable acid scavenger, such as triethylamine is used to trap the hydrogen chloride by-product. A suitable amount of an appropriate monohydric phenol, such as phenol or para-cumylphenol is added as a chain stopper to cap the ends of the copolymer with phenyl or cumyl groups, respectively.

The polymer molding compositions of the disclosure may optionally contain one or more additives including, but not limited to, antioxidants, heat stabilizers, ultraviolet (hereinafter referred to as "UV") stabilizers, fire retardants, and colorant compositions. The antioxidants useful in the instant compositions embrace a large family of compounds. Non-limiting examples of antioxidants that can be used in the molding composition of the disclosure include tris(2,4-di-tert-butylphenyl) phosphite, 3,9-di(2,4-di-tert-butylphenoxy)-2,4,8,10-tetraoxa-3,9-diphosphaspiro[5.5]undecane, 3,9-di(2,4-dicumylphenoxy)-2,4,8,10-tetraoxa-3,9-diphosphaspiro[5.5]undecane, tris(p-nonylphenyl) phosphite, 2,2',2"-nitrilo[triethyl-tris[3,3',5,5'-tetra-tertbutyl-1,1'-biphenyl-2'-diyl]phosphite], 3,9-distearyloxy-2,4,8,10-tetraoxa-3,9-diphosphaspiro[5.5]undecane, dilauryl phosphite, 3,9-di[2,6-di-tert-butyl-4-methyl-phenoxy]-2,4,8,10-tetraoxa-3,9-diphosphaspiro[5.5]undecane, tetrakis(2,4-di-tert-butylphenyl) 4,4'-bis(diphenylene)phosphonite, distearyl pentaerythritol diphosphite, diisodecyl pentaerythritol diphosphite, 2,4,6-tri-tert-butylphenyl-2-butyl-2-ethyl-1,3-propanediol phosphite, tristearyl sorbitol triphosphite, tetrakis(2,4-di-tert-butylphenyl)4,4-biphenylene diphosphonite, (2,4,6-tri-tert-butylphenyl)-2-butyl-2-ethyl-1,3-propanediolphosphite, tri-isodecylphosphite, octadecyl 3,5-di-(tert)-butyl-4-hydroxyhydrocinnamate, and the like, and mixtures containing at least one of the foregoing. Tris(2,4-di-tert-butylphenyl) phosphite, 2,4,6-tri-tert-butylphenyl-2-butyl-2-ethyl-1,3-propanediol phosphite, bis(2,4-di-tert-butylphenyl)pentaerythritol diphosphite, and bis(2,4-dicumylphenyl) pentaerythritol diphosphite are especially preferred, as well as mixtures of phosphites containing at least one of the foregoing phosphites, and the like.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

The molding compositions of the present disclosure may be prepared by mechanically blending the components in conventional mixing equipment, e.g., a single or twin-screw extruder, Banbury mixer, or any other conventional melt compounding equipment. A vacuum may also be applied to the equipment during the compounding operation to further reduce odorous materials emanating from the composition. The order in which the components of the composition are mixed is not generally critical and may be readily determined by one skilled in this art.

The molding compositions described above are valuable for producing a variety of useful articles. In an embodiment, the articles comprise outdoor enclosures for electrical and telecommunications interface devices, smart network interface devices, exterior and interior vehicle parts, external housings for garden equipment, and exterior and interior building and construction parts. Non-limiting examples of articles include those comprising exterior and interior automotive parts, window frames, window profiles, gutters, downspouts, siding, automotive bumper, doorliner, tailgate, interior parts, and fender; and snow scooter.

The molding compositions comprising different polymer resins and the silicone-acrylate impact modifier compositions disclosed herein have many advantages such as good weatherability and possess superior properties, such as superior low temperature impact and ductility, for example as compared to polymer resin compositions which comprise methyl methacrylate-butadiene-styrene block copolymer impact modifier.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXAMPLES

Notched Izod impact (hereinafter referred to as "NII") was measured by ISO 180 method, and expressed in kilojoules per square meter ($kJ/m^2$). Ductility at a chosen temperature was measured using the impact energy as well as stress whitening on the fracture surface. Generally, when stress whitening is observed, it indicates ductile failure mode. When stress whitening is not observed, it indicates a brittle failure mode. Ductility was measured by testing ten molded impact bars of a particular composition at a given temperature. The percent ductility is expressed as a percentage of impact bars that exhibited ductile failure mode.

Tensile strength was measured using ISO 527 method, and expressed in megapascals (Mpa). MVR was measured using ISO 1133 method (measured at 260° C. using a 2.16 kilogram force), and are expressed in cubic centimeters/10 minutes (cc/10 min). HDT was measured using ISO 179 method, and are expressed in ° C. Flexural modulus (hereinafter designated as "FM") was measured using ISO 178 method, and is expressed in gigapascals (Gpa).

The weatherability tests were carried out by using an Atlas G 5000 accelerated weatherometer and ISO method SAE J1960. Test samples were exposed for about 1000 kilojoules to the xenon arc lamp in the weatherometer in accordance with the test method mentioned previously. The yellowness index values were measured using a Gretag Mcbeth 7000A color spectrophotometer. The weatherability results are reported as yellowness index (also referred to as "YI") values. Gloss measurements were carried out using Micro-TRI-Gloss instrument (available from BYK-Gardner, Germany). The gloss values are reported as percent gloss retention (also referred to as "% GR"), which indicates the percent of the original gloss value retained after the weatherability test. The NII data were also measured at room temperature after the weatherability tests to determine the percentage of the initial NII retained (also referred to as "% NIR") after the weatherability test. A lower YI, a higher % NIR, and a higher % GR would indicate better weatherability performance.

The thermoplastic resins used were bisphenol A polycarbonate (PC), styrene-acrylonitrile copolymer (SAN), blends of PC and SAN, PC/PBT blends (available commercially as "Xenoy®" from GE Plastics), and ITR-PC (available commercially from GE Plastics as Lexan SLX®). Table 1 shows the loading of the various ingredients in parts by weight for preparing the molding compositions. The impact modifiers used for forming the polymer molding compositions are: MBS (methyl methacrylate-butadiene-styrene copolymer, commercially available from Rohm and Haas), S2001 (a silicone acrylate impact modifier commercially available from Mitsubishi Rayon Company), and silicone-acrylate impact modifier compositions IM-1, IM-2, IM-3, IM-4, and IM-5 prepared using the general procedure described above. Comparative examples of molding compositions comprising IM-2, IM-5, MBS, and S2001 were also prepared. "PETS" stands for pentaerythritol tetrastearate. "MZP" stands for monozinc phosphate.

Example 1

This Example describes the general procedure for preparing IM-4 silicone-acrylate impact modifier composition by a semi-continuous emulsion polymerization process without a homogenization step.

A pre-emulsion mixture was prepared by combining $D_4$ (95.5 grams), tetraethylorthosilicate (2 grams), MPTMS (2.5 grams), dodecylbenzenesulfonic acid (0.5 grams), sodium dodecylbenzenesulfonate (1 gram), and deionized water (250 grams). About 20 percent by weight of the pre-emulsion mixture was charged together with deionized water (75 grams) into a five-necked reactor equipped with a condenser, nitrogen inlet, and a stirrer, and the resulting mixture was stirred for about 3 hours while maintaining the internal temperature at about 89° C. The remainder of the pre-emulsion mixture was then fed continuously over a 3-hour period with continued stirring. After being stirred for about 2 hours at 89° C., the resulting latex was cooled down to room temperature. The pH of the silicone rubber latex was neutralized to about 7–8 using 2-weight percent aqueous sodium hydroxide solution. The final silicone rubber latex thus obtained had about 40 percent total solids, and corresponded to a silicone rubber monomer conversion of about 89–91 percent.

The neutralized silicone rubber latex obtained above (70 grams) was mixed with deionized water (285 grams) and transferred to a four-necked round-bottomed flask equipped with a condenser, nitrogen inlet, and a mechanical stirring assembly. The contents of the reactor were heated to about 75° C. under a stream of nitrogen, followed by addition of a solution of deionized water containing potassium persulfate (0.33 weight percent relative to combined weights of isooctyl acrylate and triallyl cyanurate) and sodium bicarbonate (0.33 weight percent relative to combined weights of isooctyl acrylate and triallyl cyanurate). Then the internal temperature was allowed to reach 75° C. To this mixture was added over a period of about 2 hours, a mixture made up of isooctyl acrylate (29.4 grams) and triallyl cyanurate (0.6 grams). The polymerization reaction was allowed to continue for another 2 hours at 75° C. to furnish the silicone-acrylate rubber hybrid latex as an emulsion. The monomer conversion was found to be about 96 percent.

The silicone-acrylate rubber hybrid latex obtained from the previous step (75 grams) was introduced into a jacketed reaction flask with constant agitation, and heated to an internal temperature of about 70° C. To this was added a solution made up of potassium persulfate (0.74 weight percent relative to combined weights of styrene and methyl methacrylate), sodium bicarbonate (0.74 weight percent relative to combined weights of styrene and methyl methacrylate), and water (220 grams). Then a pre-emulsion mixture of styrene (3.75 grams), methyl methacrylate (21.25 grams), sodium dodecylbenzenesulfonate (0.5 grams), and water (60 grams) was added to the reaction mixture, drop wise over a 3-hour period, while maintaining the reactor internal temperature at about 70° C. After the drop wise addition, the temperature of the reaction was maintained for another 2 hours at 70° C., and then cooled to room temperature. The monomer conversion in the resulting silicone-acrylate graft copolymer latex was around 97–98%.

The above silicone-acrylate graft copolymer latex was coagulated by first slowly adding one part by weight of the latex to 1.6 parts by weight of an aqueous 0.5–0.75 weight percent calcium chloride solution maintained at 70° C. with mechanical agitation, then continuing the stirring for about 30 minutes, and then quenching the mixture by adding about 2 kilograms of water. The coagulated polymer product was filtered using a Buckner funnel, washed thoroughly with deionized water at ambient temperature, and dried in an air oven maintained at 70° C. for at least 24 hours.

The above-described method was also used for preparing various silicone-acrylate impact modifier compositions, identified as IM-1, IM-2, IM-3, and IM-5. The monomers used for preparing each of the impact modifiers are shown in Table 1. "MMA" stands for methyl methacrylate.

TABLE 1

| Impact Modifier | Silicone rubber monomer | First graft link monomer | Branched acrylate monomer | Second graft link monomer | Polymerizable alkenyl-comprising organic material |
|---|---|---|---|---|---|
| IM-1 | $D^4$, TEOS | MAPDMMS | Isooctyl acrylate | Allyl methacrylate | Styrene/acrylonitrile |
| IM-2 | $D^4$, TEOS | MAPDMMS | n-butyl acrylate | Allyl methacrylate | Styrene/acrylonitrile |
| IM-3 | $D^4$, TEOS | MPTMS | Isooctyl acrylate | Allyl methacrylate | Styrene/acrylonitrile |
| IM-4 | $D^4$, TEOS | MPTMS | Isooctyl acrylate | TAC | MMA/styrene |

TABLE 1-continued

| Impact Modifier | Silicone rubber monomer | First graft link monomer | Branched acrylate monomer | Second graft link monomer | Polymerizable alkenyl-comprising organic material |
|---|---|---|---|---|---|
| IM-5 | $D^4$, TEOS | MPTMS | 2-ethylhexyl acrylate | TAC | MMA/styrene |

Examples 2–5 and Comparative Examples 1–7

These examples describe molding composition formulations prepared using various combinations of the thermoplastic resins and the silicone-acrylate impact modifiers described previously. The formulations prepared are shown in Table 2. In the table "NU" means the particular ingredient was not used for making the formulation. These formulations were then used for preparing molding compositions as follows. The formulations were extruded into pellets using a W&P ZSK25 twin-screw extruder and the conditions shown below.

| Zone | Temperature (Deg C.) |
|---|---|
| Feed Hopper (Zone 1) | 100 |
| Zone 2 | 200 |
| Zone 3 | 230 |
| Zone 4 | 240 |
| Zone 5 (Nozzle) | 250 |
| Zone 6 | 260 |
| Die | 260 |

The pellets were injection molded into test specimens using an Engel 30-ton injection molder and the conditions shown below.

| Zone | Temperature (Deg C.) |
|---|---|
| Feed Hopper (Zone 1) | 70 |
| Zone 2 | 230 |
| Zone 3 | 245 |
| Zone 4 | 265 |
| Zone 5 (Nozzle) | 255 |
| Mold | 40–50 |

The properties were measured on the test specimens. Results are shown in Table 3. "NA" means data are not available.

Examination of the data shown in Example 2 of Table 3 indicates that the impact modifier composition IM-1, prepared using isooctyl acrylate exhibits much better percent ductility at temperatures equal to or lower than minus 20° C., as compared with the corresponding molded part comprising MBS as the impact modifier (Comparative Example 3), S2001 impact modifier (Comparative Example 2), and n-butyl acrylate impact modifier (Comparative Example 1). Furthermore, the MVR value for the PC-SAN based molding composition comprising isooctyl acrylate is much higher than that comprising MBS (Comparative Example 3), indicating that impact modifiers prepared using isooctyl acrylate confer better processibility when they are incorporated in molding compositions. A higher MVR is desirable for better processibility. Moreover, PC-SAN based molding compositions retain the mechanical properties on par with those shown by molding compositions comprising MBS.

PC-PBT based molding composition of Example 3, comprising the impact modifier composition IM-4, prepared using isooctyl acrylate as the branched acrylate monomer shows better ductility at sub-zero temperatures while retaining mechanical properties as compared to the composition of Comparative Example 4 (which comprises the impact modifier composition IM-5, prepared using 2-ethylhexyl acrylate) and Comparative Example 5 (using S2001 impact modifier), but similar to that of Comparative Example 6 (using MBS). Furthermore, the molding composition of Example 3 (prepared using impact modifier composition IM-4) shows a significantly better MVR of 9.9 as compared to a value of 6.3 shown by the composition of Comparative Example 6. The molding composition of Example 3 also displays superior weatherability, as shown by the significantly lower YI and % GR, and % NIR values, as compared to the molding composition of Comparative Example 6, which contains MBS impact modifier.

The molding composition of Example 5 (comprising the isooctyl acrylate-based impact modifier composition IM-3) shows superior ductility at or below about minus 20° C. while retaining the mechanical properties, as compared to the composition of Comparative Example 7 which shows ductility only up to about minus 20° C.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims. All Patents cited herein are incorporated herein by reference.

TABLE 2

| Ingredients used | Parts by weight in each formulation Example | | | | | | | | | | |
|---|---|---|---|---|---|---|---|---|---|---|---|
| | 2 | 3 | 4 | 5 | 1* | 2* | 3* | 4* | 5* | 6* | 7* |
| SAN 576 | 21.8 | NU | NU | NU | 21.8 | 26.8 | 24.8 | NU | NU | NU | NU |
| Phosphite stabilizer - 1 | 0.1 | 0.4 | 0.4 | NU | 0.1 | 0.1 | 0.1 | 0.4 | 0.4 | 0.4 | NU |
| PETS | 0.3 | NU | NU | NU | 0.3 | 0.3 | 0.3 | NU | NU | NU | NU |

TABLE 2-continued

| Ingredients used | Parts by weight in each formulation Example | | | | | | | | | | |
|---|---|---|---|---|---|---|---|---|---|---|---|
| | 2 | 3 | 4 | 5 | 1* | 2* | 3* | 4* | 5* | 6* | 7* |
| Phosphite stabilizer - 2 | 0.1 | NU | NU | NU | 0.1 | 0.1 | 0.1 | NU | NU | NU | NU |
| MZP | NU | 0.1 | 0.1 | NU | NU | NU | NU | 0.1 | 0.1 | 0.1 | NU |
| Phosphite stabilizer - 3 | NU | NU | NU | 0.03 | NU | NU | NU | NU | NU | NU | 0.03 |
| PC - 105 | 40.4 | 46.4 | 46.4 | NU | 40.4 | 44.4 | 44.4 | 46.4 | 46.4 | 46.4 | NU |
| PC - 175 | 17 | NU | NU | NU | 17 | 17 | 17 | NU | NU | NU | NU |
| PBT - 315 | NU | 12.9 | 9.4 | NU | NU | NU | NU | 12.9 | 13.9 | 12.9 | NU |
| PBT - 195 | NU | 26.7 | 23.2 | NU | NU | NU | NU | 26.7 | 27.9 | 26.7 | NU |
| PET | NU | 0.3 | 0.3 | NU | NU | NU | NU | 0.3 | 0.3 | 0.3 | NU |
| Lexan SLX ® | NU | NU | NU | 80 | NU | NU | NU | NU | NU | NU | 86.7 |
| IM - 1 | 20 | NU | 20 | NU | NU | NU | NU | NU | NU | NU | NU |
| IM - 2 | NU | NU | NU | NU | 20 | NU | NU | NU | NU | NU | NU |
| IM - 4 | NU | 13.3 | NU | NU | NU | NU | NU | NU | NU | NU | NU |
| IM - 5 | NU | NU | NU | NU | NU | NU | NU | 13.3 | NU | NU | NU |
| IM - 3 | NU | NU | NU | 20 | NU | NU | NU | NU | NU | NU | NU |
| S2001 | NU | NU | NU | NU | NU | 11.1 | NU | NU | 11.1 | NU | NU |
| ASA | NU | NU | NU | NU | NU | NU | NU | NU | NU | NU | NU |
| MBS | NU | NU | NU | NU | NU | NU | 13.3 | NU | NU | 13.3 | 13.3 |

*Indicates Comparative Example

TABLE 3

| Formulation Example | NII (% ductility) at various temperatures | | | | | Tensile Strength | MVR | HDT | Flexural modulus | YI | % GR | % NIR |
|---|---|---|---|---|---|---|---|---|---|---|---|---|
| | Ambient | 0° C. | −20° C. | −30° C. | −40° C. | | | | | | | |
| 2 | 54 (100) | 52 (100) | 51 (100) | 45 (100) | 44 (100) | 43.5 | 8.4 | 98 | 2.24 | NA | NA | NA |
| 3 | 59 (100) | 46 (100) | 43 (100) | 32 (100) | 29 (100) | 43.6 | 9.9 | 68 | 2.1 | 32.8 | 84.6 | 79 |
| 4 | 53 (100) | 26 (80) | 16 (0) | NA (NA) | 13 (0) | 43.8 | 8.9 | 69.4 | 2.12 | NA | NA | NA |
| 5 | 65 (100) | 57 (100) | 51 (100) | 50 (100) | 48 (100) | 57 | 8.5 | NA | 2.19 | NA | NA | NA |
| 1* | 47 (100) | 41 (100) | 38 (100) | 29 (0) | 28 (0) | 44.6 | 6 | 99.7 | 2.18 | NA | NA | NA |
| 2* | 52 (100) | 47 (100) | 20 (0) | 15 (0) | 9 (0) | 50.4 | 6.7 | 101 | 2.22 | NA | NA | NA |
| 3* | 61 (100) | 61 (100) | 54 (60) | 52 (40) | 41 (0) | 45.7 | 1.9 | 103 | 2.24 | NA | NA | NA |
| 4* | 55 (100) | 50 (100) | 35 (40) | 21 (0) | 16 (0) | 44.3 | 9.2 | NA | 2.2 | NA | NA | NA |
| 5* | 56 (100) | 47 (100) | 21 (0) | 21 (0) | 16.5 (0) | 36.9 | 16.6 | 73 | 1.88 | NA | NA | NA |
| 6* | 53 (100) | 50 (100) | 50 (100) | 46 (100) | 42 (100) | 41.7 | 6.3 | 71 | 2 | 41.1 | 69.5 | 72 |
| 7* | 36 (100) | 34 (100) | 30 (100) | 26 (20) | 22 (0) | 57.6 | 3 | NA | 2.22 | NA | NA | NA |

*Indicates Comparative Example.

What is claimed is:

1. A silicone-acrylate impact modifier comprising structural units derived from:

at least one silicone monomer, a branched acrylate rubber monomer having the formula:

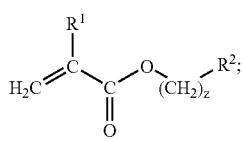

wherein R¹ is selected from hydrogen and $C_1$–$C_8$ linear and branched hydrocarbyl groups, $R_2$ is at least one branched hydrocarbyl radical selected from 3-methylbutyl, 3-methylpentyl, 4-methylpentyl, 4-methylhexyl, 5-methylhexyl, and 6-methylheptyl; and "z" is greater than or equal to 3;

a first graft link monomer, a polymerizable alkenyl-comprising organic material, and a second graft link monomer.

2. The impact modifier of claim 1, wherein said silicone monomer comprises:

at least one cyclic siloxane monomer of the formula:

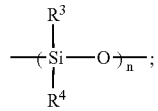

wherein $R^3$ and $R^4$ are independently selected from hydrogen and $C^1$–$C^{10}$ alkyl and aryl radicals; and "n" has a value of from about 3 to about 20; and at least one member selected from at least one trialkoxysilane, at least one tetraalkoxysilane and mixtures thereof, of the general formula:

$$(R^5)_s Si(OR^6)_{4-s};$$

wherein each $R^5$ independently comprises a $C_1$–$C_{10}$ aliphatic or aromatic hydrocarbyl radical; each $R^6$ independently comprises a $C_1$–$C_4$ aliphatic hydrocarbyl radicals; and "s" has a value of either 0 or 1.

3. The impact modifier of claim 2, wherein said silicone monomer comprises: tetraethoxysilane and at least one member selected from octamethylcyclotetrasiloxane, decamethylcyclopentasiloxane, and hexamethylcyclotrisiloxane.

4. The impact modifier of claim 1, wherein said first graft link monomer comprises at least one of an (acryloxyalkyl)alkoxysilane, a (mercaptoalkyl)alkoxysilane, a vinylalkoxysilane, or an allylalkoxysilane.

5. The impact modifier of claim 1, wherein said first graft link monomer comprises at least one of (gamma-methacryloxypropyl)(dimethoxy)methylsilane, (3-mercaptopropyl)trimethoxysilane, vinyltrimethoxysilane, or allyltrimethoxysilane.

6. The impact modifier of claim 1, wherein said polymerizable alkenyl-comprising organic material comprises at least one monomer selected from the group consisting of aromatic vinyl monomers, olefinic nitriles; branched (meth)acrylate monomers, and unbranched (meth)acrylate monomers.

7. The impact modifier of claim 1, wherein said polymerizable alkenyl-comprising organic material is at least one selected from the group consisting of styrene, divinyl benzene, alpha-methylstyrene, acrylonitrile, methacrylonitrile, butyl acrylate, and methyl methacrylate.

8. The impact modifier of claim 1, wherein said second graft link monomer is at least one polyethylenically unsaturated compound having at least one allyl group.

9. The impact modifier of claim 1, wherein said second graft link monomer is at least one selected from the group consisting of allyl methacrylate, triallyl cyanurate, triallyl isocyanurate, and diallylmaleate.

10. A silicone-acrylate impact modifier comprising structural units derived from:
a silicone monomer mixture comprising octamethylcyclotetrasiloxane and tetraethoxysilane;
a branched acrylate rubber monomer selected from the group consisting of iso-octyl acrylate, 6-methylheptyl acrylate, 6-methyloctyl acrylate, 7-methyloctyl acrylate, 7-methylnonyl acrylate, 8-methylnonyl acrylate, 10-methyldecyl acrylate, and combinations of the foregoing branched acrylate rubber monomers;
at least one first graft link monomer selected from the group consisting of (gamma-methacryloxypropyl)(dimethoxy)methylsilane and (3-mercaptopropyl)trimethoxysilane;
a polymerizable alkenyl-comprising organic material comprising at least one of styrene, alpha-methylstyrene, divinyl benzene, acrylonitrile, methacrylonitrile, or methyl methacrylate; and
at least one second graft link monomer selected from the group consisting of allyl methacrylate, triallyl cyanurate, diallyl maleate, and triallyl isocyanurate.

11. The impact modifier of claim 10, further comprising structural units derived from at least one acrylate monomer selected from the group consisting of linear alkyl acrylates.

12. A molding composition comprising a polymer resin and a silicone-acrylate impact modifier, wherein said impact modifier comprises structural units derived from:
at least one silicone monomer,
a branched acrylate rubber monomer having the formula:

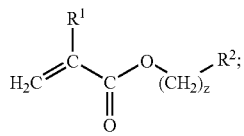

wherein $R^1$ is selected from hydrogen and $C_1$–$C_8$ linear and branched hydrocarbyl groups, $R^2$ is at least one branched hydrocarbyl radical selected from 3-methylbutyl, 3-methylpentyl, 4-methylpentyl, 4-methylhexyl, 5-methylhexyl, and 6-methylheptyl; and "z" is greater than or equal to 3;
a first graft link monomer,
a polymerizable alkenyl-comprising organic material, and
and a second graft link monomer;
wherein said molding composition has ductile-to-brittle transition temperature from about 0° C. to about minus 60° C.

13. The molding composition of claim 12, wherein said polymer resin is selected from thermoplastic and thermoset polymers.

14. The molding composition of claim 13, wherein said thermoplastic polymer is selected from the group consisting of polycarbonates, polyesters, polyolefins, polyestercarbonates, polyamides, polyethersulfones, polyetherimides, polyphenylene ethers, acrylate polymers, styrenic polymers, vinyl halide polymers, and blends of the foregoing polymers.

15. The molding composition of claim 14, wherein said thermoplastic polymer is selected from the group consisting of bisphenol A polycarbonate, 1,3-bis(4-hydroxyphenyl)-l-methyl-4-isopropylcyclohexane polycarbonate, polybutylene terephthalate, polyethylene terephthalate, acrylonitrile-styrene-acrylate core shell polymers, actylonitrile-styrene-alpha-methylstyrene-acrylate core shell polymers, styrene-acrylonitrile copolymer, styrene-methacrylonitrile copolymer, acrylonitrile-butadiene-styrene copolymer, acrylonitrile-alpha-methylstyrene-butadiene copolymer, copolymers comprising structural units derived from isophthalic acid, terephthalic acid, resorcinol, and bisphenol A; and blends of the foregoing polymers.

16. The molding composition of claim 12, wherein said impact modifier further comprises structural units derived from at least one acrylate monomer selected from the group consisting of linear alkyl acrylates.

17. A molding composition comprising a polymer resin and a silicone-acrylate impact modifier, wherein said impact modifier comprises structural units derived from:
silicone monomers comprising octamethylcyclotetrasiloxane and tetraethoxysilane;
at least one branched acrylate rubber monomer selected from the group consisting of iso-octyl acrylate, 6-methyloctyl acrylate, 7-methyloctyl acrylate, 6-methylheptyl acrylate, 7-methylnonyl acrylate, 8-methylnonyl acrylate, 10-methyldecyl acrylate, and combinations of the foregoing branched acrylate rubber monomers;
at least one first graft link monomer selected from the group consisting of (gamma-methacryloxypropyl)(dimethoxy)methylsilane and (3-mercaptopropyl)trimethoxysilane;
at least one polymerizable alkenyl-comprising organic material comprising at least one of styrene, alpha-methylstyrene, divinyl benzene, acrylonitrile, methacrylonitrile, or methyl methacrylate; and
at least one second graft link monomer selected from the group consisting of allyl methacrylate, triallyl isocyanurate, diallyl maleate, and triallyl cyanurate;
wherein said molding composition has ductile-to-brittle transition temperature from about 0° C. to about minus 60° C.

18. The molding composition of claim 17, wherein said impact modifier further comprises structural units derived from at least one acrylate monomer selected from the group consisting of linear alkyl acrylates.

19. An article of manufacture comprising the impact modifier of claim 1.

20. The article of claim 19, wherein said article comprises outdoor enclosures for electrical and telecommunications interface devices, smart network interface devices, external housings for garden equipment, exterior and interior automotive parts, window frames, window profiles, gutters, downspouts, siding, automotive bumper, doorliner, tailgate, interior parts, and fender; snow scooter, or interior building and construction parts.

21. An article of manufacture comprising the impact modifier of claim 17.

22. The article of claim 21, wherein said article comprises outdoor enclosures for electrical and telecommunications interface devices, smart network interface devices, external housings for garden equipment, exterior and interior automotive parts, window frames, window profiles, gutters, downspouts, siding, automotive bumper, doorliner, tailgate, interior parts, and fender; snow scooter, or interior building and construction parts.

23. A method for making a silicone-acrylate impact modifier, said method comprising:
    emulsion polymerizing at least one silicone monomer and a first graft link monomer at a temperature from about 30° C. to about 110° C. to form a silicone latex;
    adding to said silicone latex, at a pH of about 4 to about 9.5, and a temperature of from about 20° C. to about 90° C., at least one branched acrylate rubber monomer and a second graft link monomer to provide a silicone-acrylate rubber hybrid latex;
    grafting said silicone-acrylate rubber hybrid latex with at least one polymerizable alkenyl-comprising organic material to form a silicone-acrylate graft copolymer latex; and,
    coagulating, washing, and drying said silicone-acrylate graft copolymer latex to provide said silicone-acrylate impact modifier;
    wherein said at least one branched acrylate rubber monomer has the formula:

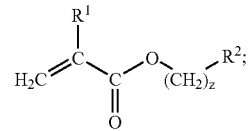

wherein $R^1$ is selected from hydrogen and $C^1$–$C^8$ linear and branched hydrocarbyl groups, $R^2$ is at least one branched hydrocarbyl radical selected from 3-methylbutyl, 3-methylpentyl, 4-methylpentyl, 4-methylhexyl, 5-methylhexyl, and 6-methylheptyl; and "z" is greater than or equal to 3.

24. The method of claim 23, wherein said method further comprises adding to said silicone latex, at least one acrylate monomer selected from the group consisting of linear alkyl acrylates.

25. The method of claim 23, wherein said silicone latex has a volume average particle size from about 50 nanometers to about 2 microns.

26. The method of claim 23, wherein said polymerizable alkenyl-comprising organic material is at least one selected from the group consisting of styrene, alpha-methylstyrene, divinyl benzene, acrylonitrile, methacrylonitrile, and methyl methacrylate.

* * * * *